United States Patent [19]
Celada et al.

[11] 3,710,808
[45] Jan. 16, 1973

[54] PRESSURE LOCK FOR FEEDING PARTICULATE MATERIAL TO AND REMOVING IT FROM A PRESSURE VESSEL

[75] Inventors: Juan Celada, Col del Valle, Monterrey; Patrick W. MacKay, Monterrey, Nuero Leon, both of Mexico

[73] Assignee: Fierro Esponja, S.A., Monterrey, N.L., Mexico

[22] Filed: Sept. 8, 1970

[21] Appl. No.: 70,027

[52] U.S. Cl. ....................137/1, 137/587, 75/34
[51] Int. Cl. ....................F16k 45/00, C21b 13/00
[58] Field of Search ..........75/1, 26, 34, 91; 137/1, 5, 137/87, 613, 340, 246.22; 266/27; 214/35; 251/86, 301

[56] References Cited

UNITED STATES PATENTS

| | | | |
|---|---|---|---|
| 2,860,046 | 11/1958 | Edstrom et al. | 75/34 X |
| 1,433,109 | 10/1922 | Brown | 214/35 A |
| 2,733,912 | 2/1956 | Newcomb et al. | 266/27 |
| 2,145,628 | 1/1939 | Milliken | 137/246.22 X |
| 1,517,786 | 12/1924 | Kus | 251/300 X |
| 1,733,833 | 10/1929 | Stanford | 251/300 X |
| 2,900,247 | 8/1959 | Celada | 75/34 |
| 3,246,978 | 4/1966 | Porter et al. | 75/34 X |

*Primary Examiner*—Henry T. Klinksiek
*Attorney*—Curtis, Morris & Safford

[57] ABSTRACT

A pressure lock for feeding particulate iron ore to a moving bed, gaseous reduction sponge iron reactor and removing sponge iron therefrom comprising a pressure hopper with valve assemblies at the inlet and outlet thereof. Each valve assembly comprises a pair of valves, one of which performs a flow control function and the other of which performs a pressure sealing function. The construction is such that contact between the flowing material and the sealing surfaces of the sealing valve is avoided, thereby eliminating abrasion and erosion of these surfaces and prolonging the effective life of the pressure lock.

20 Claims, 4 Drawing Figures

PATENTED JAN 16 1973
3,710,808
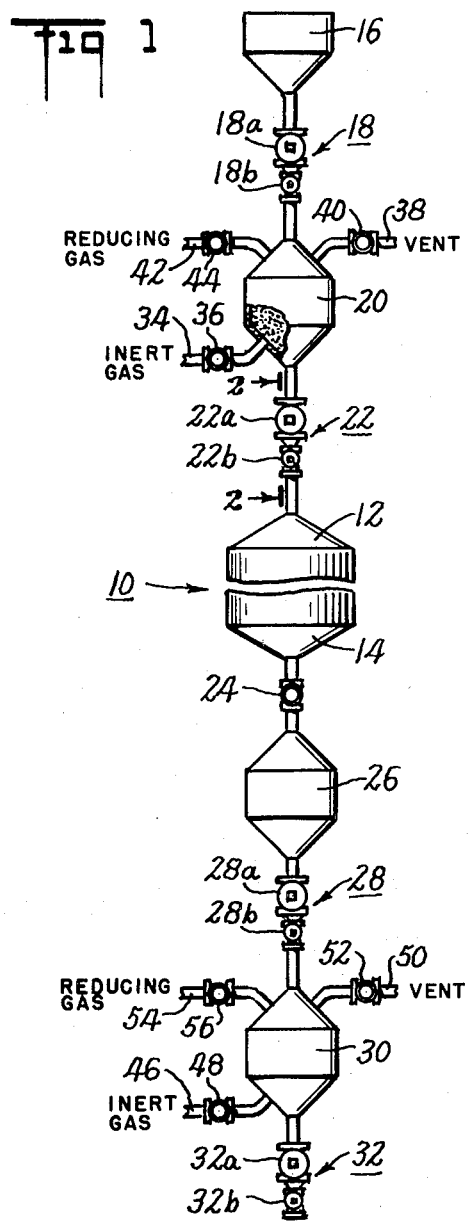
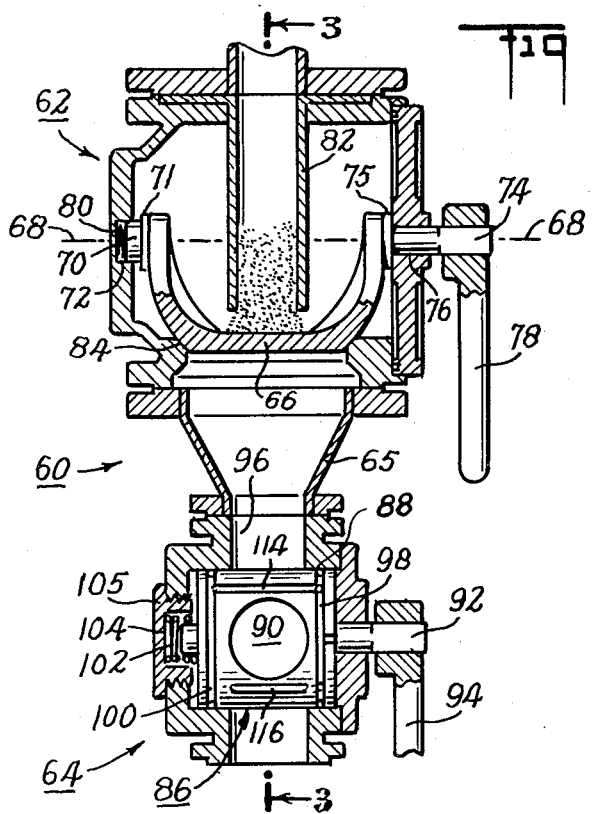
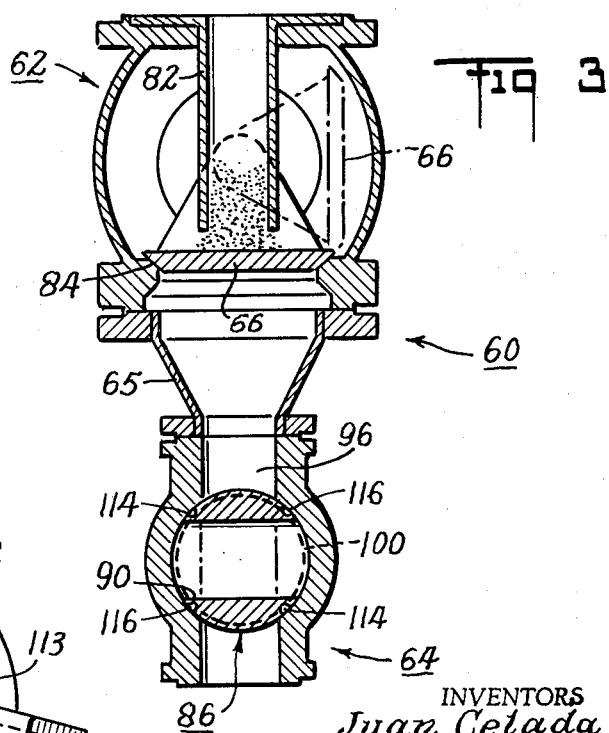
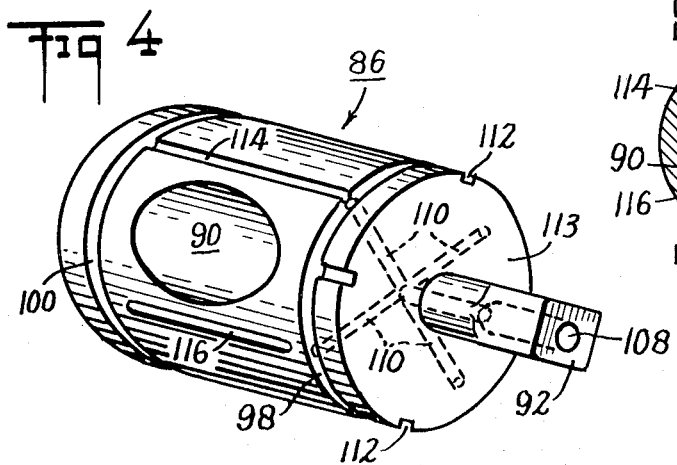
INVENTORS
Juan Celada
BY Patrick W. Mackay
Curtis, Morris, & Safford
ATTORNEYS

PRESSURE LOCK FOR FEEDING PARTICULATE MATERIAL TO AND REMOVING IT FROM A PRESSURE VESSEL

This invention relates to a pressure lock adapted to be used in the gravity feeding of particulate material to, or the gravity removal of particulate material from, a pressure vessel, and to a novel valve assembly for use in such a pressure lock, as well as to a novel method of feeding material to and removing it from a pressure vessel. In the present specification the invention will be illustratively described in connection with its application to the delivery of particulate iron ore to a pressurized, moving bed, sponge iron reactor and the removal of sponge iron from such a reactor. However, as the description proceeds, it will become apparent to those skilled in the art that structures embodying the invention may be used generally for the feeding of particulate material to pressure vessels and the removal of particulate material therefrom.

In recent years there has been an increasing interest in processes for the direct gaseous reduction of iron ore at temperatures below the melting point of iron to produce sponge iron for use in the manufacture of steel. Such direct reduction processes may be carried out in either a batch type of reactor or a continuous, i.e., moving bed, type of reactor wherein ore is fed continuously or semi-continuously to the top of the reactor and sponge iron is removed at the bottom of the reactor. In a typical moving bed reactor the ore moves downwardly through a reduction zone counter-currently to upwardly flowing hot reducing gases and the resulting sponge iron flows through a cooling zone before being removed at the bottom of the reactor.

It is known that the efficiency of the gaseous reduction process can be substantially improved by operating the reduction reactor at an elevated pressure. However, in the case of moving bed reactors the development of a commercially acceptable high pressure reactor system has been retarded because of the problems involved in feeding particulate iron ore to, and removing sponge iron from, such a pressure reactor.

It is evident that in order to introduce particulate materials into and remove them from an elevated pressure reactor, pressure locks are required and that the pressure locks must be provided with valves or equivalent mechanisms for controlling the flow of materials and providing a seal to contain the gases under pressure within the reactor. It has been found that the flow of iron ore and sponge iron through conventional types of valves tends to abrade and erode the valve surfaces to such an extent that after a relatively brief period of operation they are no longer capable of acting as a seal to contain the gas under pressure within the reactor and an unacceptable amount of gas leakage from the reactor occurs.

It is accordingly an object of the present invention to provide an improved pressure lock for use in introducing particulate materials into and removing them from a pressure vessel. It is another object of the invention to provide a pressure lock for use in feeding iron ore to and removing sponge iron from an elevated pressure, moving bed, gaseous reduction reactor, which pressure lock is capable of providing an effective gas seal for a substantially longer period of operation than the previously proposed pressure locks. It is still another object of the invention to provide an improved valve assembly for use in such a pressure lock. It is a still further object of the invention to provide a novel valve assembly and pressure lock that circumvent the abrasion and erosion problem discussed above. Other objects of the invention will be in part obvious and in part pointed out hereafter.

In general, the objects and advantages of the present invention are achieved by utilizing a valve assembly which includes separate mechanisms for controlling the flow of materials therethrough and for maintaining the necessary gas seal.

The advantages of the invention can be best understood and appreciated by reference to the accompanying drawing which illustrates apparatus incorporating a preferred embodiment of the invention and wherein:

FIG. 1 is a schematic illustration of a moving bed sponge iron reactor system with pressure locks embodying the invention at the top of the reactor for feeding ore thereto and at the bottom of the reactor for removing sponge iron therefrom;

FIG. 2 is a vertical section taken on the line 2—2 of FIG. 1, i.e., through one of the valve assemblies of FIG. 1 and showing the arrangement of the flow control and sealing valves therein;

FIG. 3 is a vertical section through the valve assembly taken on the line 3—3 of FIG. 2, i.e., at right angles to the section of FIG. 2; and FIG. 4 is a perspective view of the valve element of the sealing valve showing the conduits for distributing a sealing grease along the surfaces thereof.

Referring to the drawing and particularly to FIG. 1, the numeral 10 generally designates a vertical shaft, moving bed sponge iron reactor broken away to show only the top 12 and bottom 14 thereof. The reactor 10 may be of conventional construction and may comprise an upper section wherein iron ore is reduced with a suitable reducing gas, such as a mixture of carbon monoxide and hydrogen, and a lower section wherein the reduced ore is cooled.

Particulate iron ore to be reduced is charged to a hopper 16 and is introduced into the top of the reactor through a pressure lock comprising a first valve assembly 18, a pressure hopper 20 and a second and similar valve assembly 22. The reduced and cooled sponge iron is removed from the bottom of the reactor through a conventional rotatory mechanism 24 and flows to a storage hopper 26 which is maintained at substantially the operating pressure within the reactor. Discharge of the sponge iron from the storage hopper 26 is effected by means of a pressure lock similar to that at the top of the reactor and comprising a valve assembly 28, pressure hopper 30 and valve assembly 32. Each of the pressure hoppers 20 and 30 is provided with pressurizing, purging and venting means. More particularly, pressure hopper 20 may be purged by an inert gas supplied through a pipe 34 provided with a valve 36 and vented through pipe 38 provided with valve 40. The hopper may be pressurized with a reducing gas through a pipe 42 provided with a valve 44. Similarly, hopper 30 can be purged by inert gas supplied through a pipe 46 containing valve 48 and vented through a pipe 50 containing valve 52. Hopper 30 can be pressurized with a reducing gas through a pipe 54 provided with a valve 56.

As pointed out above, the present invention is concerned with the problem of feeding the particulate ore to the pressure reactor 10 while maintaining an effective pressure seal, notwithstanding the tendency of the flowing ore particles to abrade the valve members of the valves used to control the flow of the particles. In general, this objective is achieved in accordance with the present invention by using valve assemblies wherein different and separate structures are used to effect the flow controlling function and the sealing function of the pressure lock. The structure of the valve assemblies 18, 22, 28 and 32 for carrying out this dual function will now be described with reference to FIGS. 2 and 3, which as indicated above, are vertical sections through one of the valve assemblies.

Referring to these Figures of the drawing, the valve assembly comprises a casing or housing generally indicated by the numeral 60 and including an upper housing 62, lower housing 64 and interconnecting frusto-conical section 65. Mounted within the upper portion 62 of casing 60 there is a concavo-convex valve member 66 supported for swinging movement about an axis 68. More particularly, the upper left end of valve member 66 as shown in FIG. 2 is supported by a journal member 70 secured to the valve member and extending through a washer 71 into a recess 72 in the inner wall of the upper section 62 of the valve casing to form a journal bearing. The upper right-hand end of valve member 66 has secured thereto a journal member 74 that extends through a washer 75 and a hole 76 in the wall of the casing and has secured to its outer end a lever 78 by means of which the valve member 66 may be rotated. Within the recess 72 there is a spring 80 that is biased to maintain the valve member 66 centrally located within the upper section of the casing.

Particulate iron ore is introduced into the upper section of the valve assembly through a feed pipe 82 which extends to a point below the axis 68 and preferably to a point only a short distance above the concave surface of valve member 66 so that when the valve is in its lower or closed position only a relatively small amount of the particulate ore collects in the space between the bottom of feed tube 82 and the valve member. When the valve member 66 is in its lower position as shown in FIG. 2 and in solid lines in FIG. 3, it cooperates with a valve seat 84 formed in the lower part of the upper section 62 of the casing. It is not necessary that the valve member 66 engage the seat 84 tightly since the valve member 66 performs only a flow controlling function and the sealing function is performed by the structure in the lower section 64 of the valve assembly described below. As indicated in FIG. 3, the valve member 66 is rotatable from the position shown in solid lines wherein it confronts the lower end of feed tube 82 to the position shown in dotted lines wherein it is positioned at one side of the feed tube.

In the lower section 64 of the valve assembly casing there is a cylindrical valve plug 86 and cooperating valve seat 88. The valve plug 86 and its cooperating seat 88 are of generally conventional construction and the valve plug has a cylindrical port 90 extending therethrough. It is made rotatable within the cylindrical seat 88 by means of a journal member 92 which extends through the wall of the lower section 64 of the casing and has secured to its outer end a lever 94 by means of which the valve plug may be rotated to bring the port 90 into registry with a passage 96 extending vertically through the lower section 64 of the valve casing. Grooves 98 and 100 are provided at opposite ends of the valve plug to contain a sealing lubricant as more fully described below and thereby provide a tight seal between the valve plug 86 and its seat 88 to prevent flow of pressure fluid through the passage 96 when the valve plug is so positioned that port 90 is out of registry with passage 96. A spring 102 located in a recess 104 of a cap 105 threaded into the side wall of lower section 64 of the casing is biased to urge the valve plug toward and against the opposite wall of the casing.

The valve assembly is so constructed as to prevent contact between the particulate ore and the sealing surfaces of the valve plug 86. When it is desired to cause the particulate ore to flow through the valve assembly, the valve plug 86 is rotated to bring port 90 into registry with passage 96 and thereafter valve member 66 is swung to the position shown in dotted lines in FIG. 3. The cross-sectional area of the interior of feed tube 82 is desirably no greater than and preferably somewhat less than the cross-sectional area of port 90. Also the cross-sectional area of passage 96 is desirably no greater than and preferably somewhat less than the cross-sectional area of port 90. Thus as the particulate material flows through the valve assembly it does not come in contact with the sealing surface of the valve plug. Also by making the cross-sectional area of feed tube 82 less than that of port 90, abrasion of the internal surface of port 90 is minimized as the particulate material flows therethrough.

Reverting now to FIG. 1, the feeding and discharging operation of the pressure locks will now be described. For convenience in describing this operation, the valve member 66 of the uppermost valve assembly 18 will be designated as 18a and the valve plug 86 of the uppermost valve assembly will be designated 18b. Corresponding "a" and "b" designations will be used for the valve assemblies 22, 28 and 32. The hopper 16 is charged from time to time as required with particulate ore to be fed to the pressure reactor 10. At the beginning of a reactor charging cycle, the valves 18a, 18b, 22a, 22b, 36 and 44 are normally closed and valve 40 open. When it is desired to charge a quantity of iron ore to the pressure reactor, sealing valve 18b is first opened, that is, its port 90 is brought into registry with passage 96. The valve member 66 of valve assembly 18 is then swung to its open position to permit particulate ore to flow into the pressure hopper 20. The quantity of ore entering the hopper 20 can be controlled either by limiting the quantity of ore charged to hopper 16 or by providing an automatic level controller responsive to the ore level in hopper 20. When the desired amount of ore has been charged to the hopper 20, valve 18a is closed first to shut off the flow of ore particles and thereafter valve 18b is closed.

The inert gas valve 36 is then opened to purge the interior of hopper 20, after which vent valve 40 and inert gas valve 36 are closed. Reducing gas valve 44 is then opened to pressurize hopper 20, i.e., to bring the hopper to a pressure substantially equal to that in the reactor 10. Where, as in the embodiment here being described, reducing gas is used to pressurize the hopper 20, it is important that the hopper first be purged with inert gas in order to avoid the possible formation of an explosive mixture in the hopper. When the desired hopper pressure is reached, valve 44 is closed.

After the hopper has been pressurized, valve 22b is first opened and then valve 22a is opened to permit the particulate ore to flow into the reactor, after which valve 22a and then valve 22b are closed to provide a tight seal that prevents escape of pressure gas from reactor 10.

The discharge of sponge iron at the bottom of the reactor is effected in a generally similar manner. The sponge iron is continuously removed through the rotatory mechanism 24 and flows into the storage or accumulation hopper 26 which is maintained at the same pressure as the reactor. From time to time sponge iron is removed from the storage hopper 26 through the lower pressure lock of the reactor system. During accumulation of sponge iron in the storage hopper 26, valves 28a, 28b, 32a, 32b, 48 and 56 are normally closed and valve 52 open. When it is desired to remove a quantity of the sponge iron from storage hopper 26, valve 48 is opened to purge the hopper 30 and after the purging is completed valves 52 and 48 are then closed, after which reducing gas valve 56 is opened to bring hopper 30 to substantially the pressure in the reactor 10 and then valve 56 is closed. Thereafter valve 28b of valve assembly 28 is opened and then valve 28a is opened to permit the sponge iron to flow into the pressure hopper 30. Thereafter first valve 28a and then valve 28b are closed. Valve 52 is opened to vent the pressure hopper 30, after which first valve 32b is opened and then valve 32a is opened to permit the sponge iron under atmospheric pressure to flow out of the reactor system to a suitable point of storage or use. After removal of the sponge iron from hopper 30, valves 32a and 32b are closed.

In achieving an effective seal against leakage of gas under pressure from the reactor, it has been found important to provide a substantially complete film of a suitable lubricant between the valve plug 86 and its seat. To this end the valve plug is provided with various lubricant distributing passages and grooves as particularly shown in FIG. 4. Referring to FIG. 4, lubricant under pressure is forced through a lubricant supply passage 108 in the journal or stem 92 into a series of four radial passages 110 through which it flows outwardly to the circumferential groove 98. From groove 98 lubricant flows through each of a series of slots 112 to lubricate the adjacent end surface 113 of the valve. Also lubricant flows from groove 98 through a pair of longitudinal slots 114 (only one of which is shown) to a second circumferential groove 100 near the opposite end of the valve. A pair of closed end grooves 116 (only one of which is shown) are formed in the valve face and circumferentially spaced from both the grooves 114 and the port 90. Grooves 116 collect lubricant as the valve is rotated and serve to further promote lubrication of the valve surface. The grooves 114 and 116 are desirably positioned circumferentially at 90° intervals.

For optimum results additional lubricant should be forced through passage 108 after each cycle of operation to provide a fresh lubricant film between the valve and its seat. Excess lubricant exudes into the port 90 and is carried away by the ore flowing therethrough.

The cap 105 can be removed from time to time to remove lubricant accumulating in the recess 104. By frequently renewing the lubricant film between the valve plug surface and its seat, wear due to dust or abrasive particles can be minimized.

From the foregoing description it should be apparent that the present invention provides a pressure lock capable of providing the advantages outlined at the beginning of the present specification. By providing separate mechanisms for carrying out the flow controlling and sealing functions, effective sealing of the pressure reactor is achieved over a longer period of time than has heretofore been possible. It is, of course, to be understood that the foregoing description is intended to be illustrative, and that numerous modifications can be made within the scope of the invention. For example, although the valves have been described as manually operated, it is apparent that desired sequence of valve operations can be achieved by an automatic control mechanism. Other modifications within the scope of the invention will be apparent to those skilled in the art.

We claim:

1. A pressure lock adapted to be used in the gravity feeding of particulate material to, or the gravity removal of particulate material from, a pressure vessel, said pressure lock comprising a pressure hopper, a first valve assembly connected to the top of said hopper and a second valve assembly connected to the bottom of said hopper, each of said valve assemblies comprising a substantially vertically disposed casing communicating with said hopper, a concavo-convex valve member pivotally mounted in the upper side walls of said casing for swinging movement about a substantially horizontal axis, a feed tube positioned at the top of said casing for conducting particulate material into said casing above said valve member, said valve member being selectively swingable from a position in which its concave surface confronts the lower end of said feed tube to a position at one side of said feed tube, and a plug valve comprising a valve plug and seat substantially horizontally arranged in the lower portion of said casing, said valve plug seat having a passage therethrough and said plug valve having a port adapted to register with said plug valve seat passage, said valve plug being selectively rotatable to bring said port into registry with said valve seat passage.

2. A pressure lock according to claim 1 wherein said hopper is provided with venting means and gas pressurizing means.

3. A pressure lock according to claim 1 wherein said hopper is provided with venting means, gas purging means and gas pressurizing means.

4. A pressure lock adapted to be used in the gravity feeding of particulate material to, or the gravity removal of particulate material from, a pressure vessel, said pressure lock comprising a pressure hopper, a first valve assembly connected to the top of said hopper and a second valve assembly connected to the bottom of said hopper, each of said valve assemblies comprising a substantially vertically disposed casing communicating with said hopper, a concavo-convex valve member pivotally mounted in the upper side walls of said casing for swinging movement about a substantially horizontal axis, a feed tube positioned at the top of said casing for conducting particulate material into said casing above said valve member, said valve member being selectively swingable from a position in which its concave surface confronts the lower end of said feed tube to a position completely at one side of said feed tube, and a plug valve comprising a valve plug and seat substantially horizontally arranged in the lower portion of said casing, said plug valve seat having a passage therethrough and said valve plug having a port adapted to register with said plug valve seat passage, said port having a cross-sectional area at least as large as the cross-sectional area of said feed tube, said valve plug being selectively rotatable to bring said port into registry with said valve seat passage.

5. A pressure lock adapted to be used in the gravity feeding of particulate material to, or the gravity removal of particulate material from, a pressure vessel, said pressure lock comprising a pressure hopper, a first valve assembly connected to the top of said hopper and a second valve assembly connected to the bottom of said hopper, each of said valve assemblies comprising a substantially vertically disposed casing communicating with said hopper, a concavo-convex valve member pivotally mounted in the upper side walls of said casing for swinging movement about a substantially horizontal axis, a feed tube positioned at the top of said casing for conducting particulate material into said casing above said valve member and extending downwardly to a point below said horizontal axis, said valve member being selectively swingable from a position in which its concave surface confronts the lower end of said feed tube to a position completely at one side of said feed tube, and a plug valve comprising a valve plug and seat substantially horizontally arranged in the lower portion of said casing, said plug valve seat having a vertical passage therethrough and said valve plug having a port adapted to register with said plug valve seat passage, said port having a cross-sectional area at least as large as the cross-sectional area of said feed tube, said valve plug being selectively rotatable to bring said port into registry with said valve seat passage and said valve plug and valve seat having a layer of sealing lubricant therebetween.

6. A valve assembly adapted to be used in a pressure lock for the gravity feeding of particulate material to, or removal of particulate material from, a pressure vessel, said valve assembly comprising a substantially vertically disposed casing, a concavo-convex valve member pivotally mounted in the upper side walls of said casing for swinging movement about a substantially horizontal axis, a feed tube positioned at the top of said casing for conducting particulate material into said casing above said valve member, said valve member being selectively swingable from a position in which its concave surface confronts the lower end of said feed tube to a position at one side of said feed tube, and a plug valve comprising a valve plug and seat substantially horizontally arranged in the lower portion of said casing, said plug valve seat having a passage therethrough and said valve having a port adapted to register with said valve plug seat passage, said plug valve being selectively rotatable to bring said port into registry with said valve seat passage.

7. A valve assembly adapted to be used in a pressure lock for the gravity feeding of particulate material to, or removal of particulate material from, a pressure vessel, said valve assembly comprising a substantially vertically disposed casing, a concavo-convex valve member pivotally mounted in the upper side walls of said casing for swinging movement about a substantially horizontal axis, a feed tube positioned at the top of said casing for conducting particulate material into said casing above said valve member, said valve member being selectively swingable from a position in which its concave surface confronts the lower end of said feed tube to a position completely at one side of said feed tube, and a plug valve comprising a valve plug and seat substantially horizontally arranged in the lower portion of said casing, said plug valve seat having a passage therethrough and said valve plug having a port adapted to register with said plug valve seat passage, said port having a cross-sectional area at least as large as the cross-sectional area of said feed tube, said valve plug being selectively rotatable to bring said port into registry with said valve seat passage.

8. A valve assembly adapted to be used in a pressure lock for the gravity feeding of particulate material to, or removal of particulate material from, a pressure vessel, said valve assembly comprising a substantially vertically disposed casing, a concavo-convex valve member pivotally mounted in the upper side walls of said casing for swinging movement about a substantially horizontal axis, a feed tube positioned at the top of said casing for conducting particulate material into said casing above said valve member and extending downwardly to a point below said horizontal axis, said valve member being selectively swingable from a position in which its concave surface confronts the lower end of said feed tube to a position completely at one side of said feed tube, and a plug valve comprising a cylindrical valve plug and seat substantially horizontally arranged in the lower portion of said casing, said plug valve seat having a passage therethrough and said valve plug having a port adapted to register with said plug valve seat passage, said port having a cross-sectional area at least as large as the cross-sectional area of said feed tube, said valve plug being selectively rotatable to bring said port into registry with said valve seat passage and said valve plug and valve seat having a layer of sealing lubricant therebetween.

9. A valve assembly according to claim 8 wherein the cross-sectional area of said feed tube is less than the cross-sectional area of said port.

10. A valve assembly according to claim 8 wherein the cross-sectional area of said port is at least as large as the cross-sectional area of said plug valve seat passage.

11. A valve assembly according to claim 8 wherein the valve plug has a valve surface in sealing relation with said seat and said valve surface is provided with lubricant grooves.

12. A valve assembly according to claim 11 wherein said valve plug has a stem with a lubricant supply passage formed therein and said lubricant supply passage communicates with said lubricant grooves.

13. A valve assembly according to claim 11 in which the valve surface of said valve plug has both circumferential and axial lubricant grooves formed therein and intercommunicating with one another.

14. A method of gravity charging particulate material to a pressurized reduction reactor of the type in which the material to be fed passes in sequence from a supply hopper through a first valve assembly, a pressure hopper and a second valve assembly to said pressure vessel, each of said valve assemblies comprising a materials flow control valve and a lubricated plug type sealing valve arranged in series, said method comprising the steps of opening the sealing valve of said first valve assembly, opening the control valve of said first valve assembly to cause particulate material to flow from said supply hopper to said pressure hopper, closing the control valve of said first valve assembly, closing the sealing valve of said first valve assembly, pressurizing said pressure hopper to about the pressure of said pressurized reactor, opening the sealing valve of said second valve assembly and opening the control valve of said second valve assembly to cause said particulate material to flow into said pressure reactor.

15. A method of gravity charging particulate material to a pressurized reduction reactor of the type in which the material to be fed passes in sequence from a supply hopper through a first valve assembly, a pressure hopper and a second valve assembly to said pressure vessel, each of said valve assemblies comprising a materials flow control valve and a lubricated plug type sealing valve arranged in series, said method comprising the steps of opening the sealing valve of said first valve assembly, opening the control valve of said first valve assembly to cause particulate material to flow from said supply hopper to said pressure hopper, closing the control valve of said first valve assembly, closing the sealing valve of said first valve assembly, purging said hopper with an inert gas, pressurizing said pressure hopper to about the pressure of said pressurized reactor, opening the sealing valve of said second valve assembly and opening the control valve of said second valve assembly to cause said particulate material to flow into said pressure reactor.

16. A method according to claim 15 wherein after purging of said pressure hopper the hopper is pressurized with a reducing gas.

17. A method according to claim 15 wherein fresh lubricant is forced between the valve plug and seat of said lubricated plug type valves after each charge is introduced into said reactor.

18. A method for the gravity removal of particulate material from a pressurized reduction reactor of the type in which the material to be removed passes in sequence from a storage hopper communicating with the bottom of said reactor through a first valve assembly, a pressure hopper and a second valve assembly to a point of discharge at atmospheric pressure, each of said valve assemblies comprising a materials flow control valve and a lubricated plug type sealing valve arranged in series, said method comprising the steps of purging said pressure hopper with an inert gas, pressurizing said pressure hopper to about the pressure of said reactor, opening the sealing valve of said first valve assembly, opening the control valve of said first valve assembly to cause particulate material to flow from said storage hopper to said pressure hopper, closing the control valve of said first valve assembly, closing the sealing valve of said first valve assembly, venting said pressure hopper to the atmosphere, opening the sealing valve of said second valve assembly and opening the control valve of said second valve assembly to cause said particulate material to flow out of said pressure hopper.

19. A method according to claim 18 wherein said pressure hopper is pressurized with a reducing gas.

20. A method according to claim 18 wherein fresh lubricant is forced between the valve plug and seat of said lubricated plug type valves after removal of each charge from said pressure hopper.

* * * * *